April 15, 1930.  W. D. MOUNT  1,754,902
CONTINUOUS SULPHATE PROCESS
Filed Jan. 11, 1929
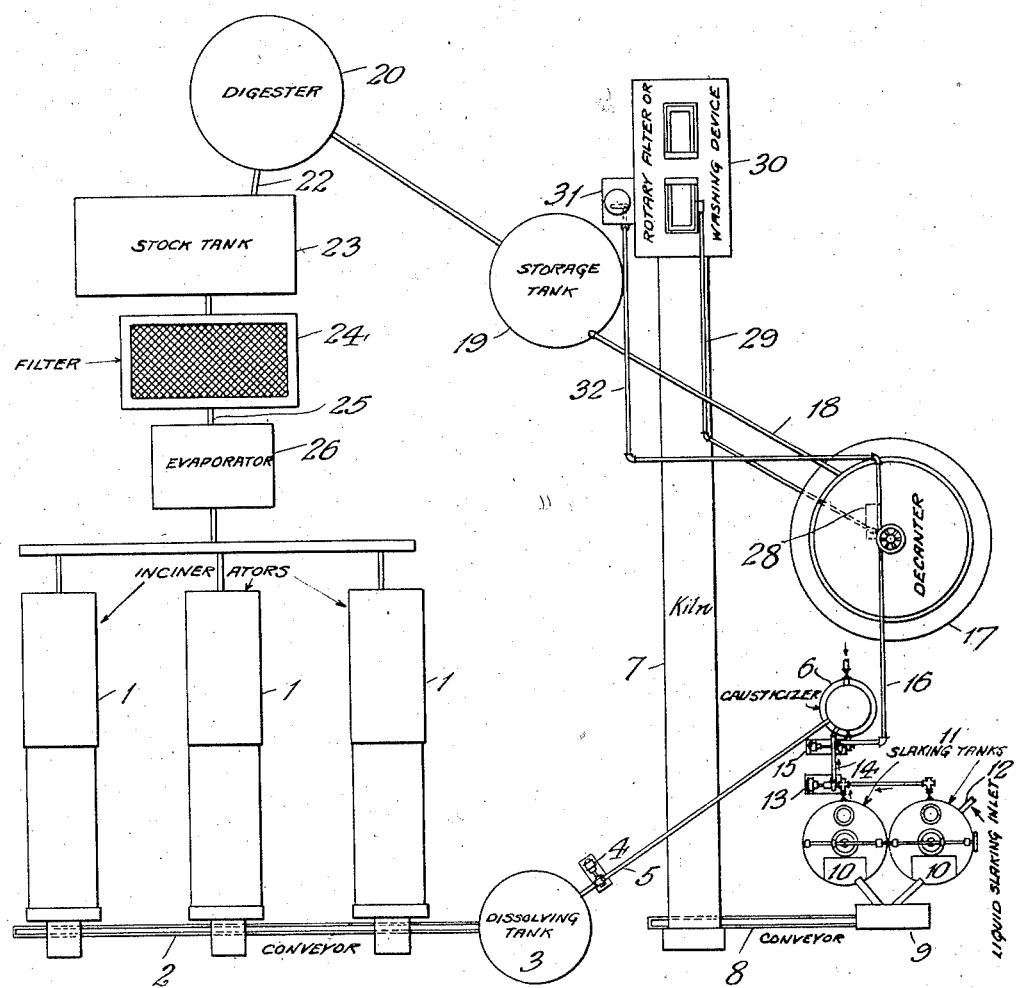
INVENTOR
WILLIAM D. MOUNT.
BY Victor D Borst
ATTORNEY Patented Apr. 15, 1930

1,754,902

UNITED STATES PATENT OFFICE

WILLIAM D. MOUNT, OF LYNCHBURG, VIRGINIA, ASSIGNOR OF ONE-HALF TO KENRICK A. FORREST, OF HARVEY, ILLINOIS

CONTINUOUS SULPHATE PROCESS

Application filed January 11, 1929. Serial No. 331,892.

My invention has reference to the art practiced in the pulp industry and it is particularly directed to the sulphate or kraft process. Specifically my invention contemplates an improved continuous sulphate process in which part of the apparatus commonly thought necessary is eliminated.

An important part of any pulp mill is what is known as the recovery end in which the chemicals used in producing the pulp are recovered. There are two sources from which the spent chemicals are collected, namely, the causticizer and the digester. In the causticizer, the spent chemicals are in the form of solid compounds and organic material. These by-products of the causticizer settle to the bottom and are drawn off in the form of a sludge which is commonly termed the caustic sludge, and contains calcium carbonate, caustic liquor, and organic materials. The caustic sludge may, after filtering and washing, be calcined in a rotary kiln where the calcium carbonate is reduced to calcium oxide or lime for reuse in the causticizer.

The second source of spent chemicals is, as hereinbefore mentioned, the digester, from whence is drawn a black liquor, which, after concentrating in an evaporator, is charred in a rotary furnace or incinerator. The furnace or incinerator discharge is in the form of a semi-pasty mass which, together with salt cake or sodium sulphate, is delivered into a smelting furnace where the mass is reduced to a molten condition, and the sodium sulphate reduced to sodium sulphide.

For many reasons, it would be desirable to eliminate the smelter from the recovery apparatus but because of its function of supplying sodium sulphide by reducing the salt cake it has been deemed essential.

In accordance with my invention, I provide a process whereby the smelting furnace is eliminated from the recovery end of the sulphate mill. I accomplish the above by burning the concentrated black liquor from the digester to a complete black ash in the incinerator or rotary furnace, and reducing the salt cake or sodium sulphate to sodium sulphide in a rotary kiln along with the reduction to calcium oxide of the calcium carbonate contained in the caustic sludge. By proper control of the kiln operation, I find that I may at the same time change some of the sodium sulphate to sodium carbonate, and in this way make up for the loss of sodium hydrate inevitable in the cyclic operation of the process.

A detailed description of one way in which the invention may be carried out will be given in connection with the accompanying drawing which shows a diagrammatic illustration of an application of the invention to a wood pulp plant.

Referring to the drawing, one or more incinerators 1 are arranged to discharge their products continuously onto a drag conveyor 2. The conveyor 2 carries the discharge of the incinerators to a dissolving tank 3 into which a suitable dissolving liquid is introduced. In the tank 3, the ash will be completely dissolved, and the insoluble impurities will settle to the bottom of the tank. The clear liquor is decanted, and by means of a pump 4 and suitable pipe 5 transferred to the continuous causticizing unit 6. The undissolved ingredients are drawn off from the bottom of the dissolving tank 3 and after washing are discarded.

A rotary kiln 7 discharges its products, principally lime, sodium sulphide and sodium carbonate, onto a drag conveyor 8 which carries it to a suitable bucket conveyor 9. By means of the bucket conveyor, the mass is selectively introduced into either of the slaking baskets 10 at the top of the slaking pots 11. A suitable slaking liquid is introduced into the pots 11 by means of the inlet 12. The contents of the baskets 10 are in contact with the slaking liquid whereby the lime in the mixture is thoroughly slaked and the other ingredients dissolved. After slaking and dissolving, the contents of the slaking pots 11 are drawn and delivered to the continuous causticizing unit 6 by means of a pump 13 and pipe line 14.

In the continuous causticizing unit 6, the solutions delivered from the dissolving tank 3 and the slaking pots 11 are mixed, and the resultant solution is completely causticized. The causticized solution or white liquor is continuously transferred by means of the pump 15 and through the pipe 16 to a decanter 17 where it is clarified by continuous decantation. The solid materials held in suspension by the white liquor settle to the bottom of the decanter 17. The clear white liquor is transferred through the pipe 18 to a storage tank 19 where it is held in storage to be delivered to the digester as needed.

In the digester 20 the white liquor, which in the practice of some mills is mixed with black liquor, is brought into contact with the wood chips under conditions favoring its solvent action therewith. The liquor is divested of its solvent and hydrolizing properties by the action on the wood chips, and wood pulp and new chemical combinations are formed. The magma of wood pulp and spent chemicals or by-products of the digester is delivered to a stock storage tank 23 through the pipe 22.

In the stock storage tank the consistency of the magma is reduced by the addition of black liquor and then delivered to the filter 24 where the liquid portion is separated from the pulp.

The black liquor from the filter is delivered to the evaporator 26 through a pipe 25, where it is concentrated by evaporation, and then delivered to the incinerators or rotary furnaces 1 where it is burned to a complete black ash.

Heretofore, it has been the common practice in the sulphate process to more or less char, in the incinerators, the black liquor, delivered from the evaporators. This more or less charred semi-pasty mass delivered from the incinerators is shovelled, together with sodium sulphate, into a smelter. In the smelter, the mass is burned to a molten condition and the sodium sulphate reduced to sulphide. It has been assumed that the smelter is absolutely essential for the reduction of the salt cake, in the present embodiment, the black liquor delivered from the evaporators is burned to a complete black ash in the incinerators or rotary furnace. The organic material contained in the black ash supplies to some extent the necessary fuel for burning the black liquor to a black ash. The black ash, as it comes from the incinerators, without any additions, is delivered to the dissolving tank 3 as hereinbefore explained.

From the bottom of the decanter 17, the caustic sludge which contains principally calcium carbonate is delivered by means of a suitable pump 28 and pipe line 29 to a continuous rotary filter device 30 where the solid materials are washed and separated from the liquid. The liquid separated from the caustic sludge is collected in a trap device 31 and may be returned to the slaking pots 11 through the pipe line 32.

As the solid materials contained in the caustic sludge are discharged from the filter, the sodium sulphate is added, together with a certain portion of carbon and the mixture is delivered directly to the rotary kiln 7.

In the kiln 7, the mixture of the caustic sludge and sodium sulphate is calcined. The result of the calcination of the aforementioned mixture is to reduce the calcium carbonate to calcium oxide, and the sodium sulphate to sodium sulphide. It has been observed, that with proper control of the kiln operation some of the sodium sulphide may be changed to sodium carbonate, and in this way the losses of sodium hydrate, inevitable in the cyclic operation, may be replenished.

The cyclic operation of the process will be apparent from the foregoing description.

All of the apparatus employed is that frequently found and used in chemical industries and for that reason is shown only diagrammatically. It will be understood, however, that various changes in the details of the apparatus, and in the steps and details of the process, that is herein described for the purpose of explaining the nature of the invention, may be made by those skilled in the art within the principle and scope of the invention as expressed in the appended claims.

I claim:

1. A process for producing sulphate pulp which comprises the digesting of the wood by means of the alkali liquor, the separation of the pulp and spent liquor, the evaporation of the moisture and burning of the solid organic materials in the spent liquor, the dissolving of the resultant ash, the separation of the solid impurities therefrom, the causticizing of the liquor, the separation of the sludge therefrom, and the reuse of the clear liquor for digesting wood.

2. A process for producing sulphate pulp which comprises the digesting of the wood by means of the alkali liquor, the separation of the pulp and spent liquor, the evaporation of the moisture and burning of the solid organic materials in the spent liquor, the dissolving thereof as it comes from the incinerators, the separation of the impurities therefrom, the causticizing of the liquor, the separation of the sludge therefrom, and the reuse of the clear liquor for digesting wood.

3. A process for producing sulphate pulp which comprises the preparation of a caustic liquor, the separation of the sludge therefrom, the adding of sodium sulphate and carbon to the sludge, the calcination of the mixture of sludge and sodium sulphate, the using of the calcined mixture for causticizing, and the use of the clear liquor for digesting of wood.

4. A process for producing sulphate pulp which comprises the preparation of a caustic liquor, the separation of the sludge therefrom, the adding of sodium sulphate and carbon to the sludge, the recovery of lime from the sludge and the reduction of sodium sulphate to sodium sulphide by calcination of the mixture, the use of the lime and sodium sulphide for causticizing, and the use of the clear liquor for digesting the wood.

5. A process for producing sulphate pulp which comprises the preparation of a caustic liquor, the separation of the sludge therefrom, the adding of sodium sulphate and carbon to the sludge, the recovery of lime from the sludge and the reduction of sodium sulphate to sodium sulphide and sodium carbonate by calcination of the mixture in the presence of carbon, the use of the lime, sodium sulphide and sodium carbonate for causticizing, and the use of the clear liquor for digesting wood.

6. A process for producing sulphate pulp which comprises the digesting of the wood by means of alkali liquor, the separation of the pulp and spent liquor, the evaporation of the moisture and burning of the solid materials in the spent liquor, the dissolving of the resultant ash, the separation of the solid impurities therefrom, the causticizing of the liquor, the separation of the sludge therefrom, the adding of sodium sulphate and carbon to the sludge, the recovery of the lime from the sludge and the reduction of sodium sulphate by calcination of the mixture, the use thereof for causticizing, and the use of the clear liquor for digesting the wood.

7. A process for producing sulphate pulp which comprises the preparation of a caustic liquor, the separation of the sludge therefrom, the adding of sodium sulphate and carbon to the sludge, the calcination of the mixture, the use of the clear liquor for digesting of the wood, the separation of the pulp and spent liquor, the evaporation of the moisture and burning of the solid materials in the spent liquor, and the use of the resultant ash and the products of calcination of the mixture of caustic sludge and sodium sulphate for causticizing.

In witness whereof, I hereunto subscribe my signature.

WILLIAM D. MOUNT.